US009990811B2

(12) United States Patent
Watanabe

(10) Patent No.: US 9,990,811 B2
(45) Date of Patent: Jun. 5, 2018

(54) POINT-OF-SALE (POS) TERMINAL HAVING A LOCK SYSTEM

(71) Applicant: TOSHIBA TEC KABUSHIKI KAISHA, Tokyo (JP)

(72) Inventor: Osamu Watanabe, Fuji Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/408,106

(22) Filed: Jan. 17, 2017

(65) Prior Publication Data

US 2017/0206751 A1 Jul. 20, 2017

(30) Foreign Application Priority Data

Jan. 20, 2016 (JP) ................................ 2016-008981

(51) Int. Cl.

| | |
|---|---|
| ***G06K 15/00*** | (2006.01) |
| ***G07G 1/00*** | (2006.01) |
| ***E05B 47/00*** | (2006.01) |
| ***E05B 63/14*** | (2006.01) |
| ***E05B 65/06*** | (2006.01) |
| ***E05B 65/44*** | (2006.01) |
| ***E05B 47/02*** | (2006.01) |
| ***E05B 63/24*** | (2006.01) |
| ***E05C 3/04*** | (2006.01) |
| ***G07G 3/00*** | (2006.01) |

(52) U.S. Cl.

CPC ....... *G07G 1/0027* (2013.01); *E05B 47/0004* (2013.01); *E05B 47/026* (2013.01); *E05B 63/14* (2013.01); *E05B 63/24* (2013.01); *E05B 65/06* (2013.01); *E05B 65/44* (2013.01); *E05C 3/042* (2013.01); *G07G 1/0018* (2013.01); *G07G 1/0045* (2013.01); *G07G 3/003* (2013.01); *E05B 2047/0085* (2013.01); *E05B 2047/0086* (2013.01)

(58) Field of Classification Search

CPC ......... G06Q 30/06; G06Q 20/20; G07G 1/054

USPC .......................................................... 235/383

See application file for complete search history.

(56) References Cited

U.S. PATENT DOCUMENTS

2006/0070412 A1* 4/2006 Wiseman ............ E05B 47/0603 70/88

2014/0090429 A1* 4/2014 Takasaka ................ E05B 27/00 70/490

(Continued)

FOREIGN PATENT DOCUMENTS

JP 2015141586 A 8/2015

*Primary Examiner* — Ahshik Kim

(74) *Attorney, Agent, or Firm* — Patterson & Sheridan, LLP

(57) ABSTRACT

A point-of-sale (POS) terminal includes a main body, a door attached to the main body, an electric lock attached to one of the main body and the door and including a first movable part configured to move between a lock position and an unlock position using electric power, and a manual lock attached to the other one of the main body and the door and including a second movable part that is manually movable between a lock position and an unlock position. When the door is in a closed state and the first and second movable parts are both at the lock position, the first and second movable parts restrict movement of the door. When the door is in the closed state and at least one of the first and second movable parts is at the unlock position, the door is movable.

20 Claims, 6 Drawing Sheets

(56) References Cited

U.S. PATENT DOCUMENTS

| | | | | |
|---|---|---|---|---|
| 2015/0186861 | A1* | 7/2015 | Glatt | G06Q 20/206<br>705/71 |
| 2017/0132601 | A1* | 5/2017 | Susaki | G06Q 10/087 |
| 2017/0132882 | A1* | 5/2017 | Susaki | G07G 1/0027 |

* cited by examiner (a)

(b)

(a)

(b)

POINT-OF-SALE (POS) TERMINAL HAVING A LOCK SYSTEM

CROSS-REFERENCE TO RELATED APPLICATION

This application is based upon and claims the benefit of priority from Japanese Patent Application No. 2016-008981, filed Jan. 20, 2016, the entire contents of which are incorporated herein by reference.

FIELD

Embodiments described herein relate generally to a lock system and a point-of-sale (POS) terminal having the lock system.

BACKGROUND

An electronic device of one type includes a door for opening and closing a space formed in a housing thereof and a lock for the door. Conventionally, the lock arranged in such an electronic device is either an electric lock or a manual lock. The electric lock can be locked or unlocked by moving a bolt thereof using electric power. The manual lock can be locked or unlocked by manually moving a bolt thereof. Conventionally, one of the electric lock and the manual lock is selectively used according to the design requirements of the electronic device.

Recently, there is a demand by users of the electronic device to use both the electric lock and the manual lock. For example, a point-of-sale (POS) terminal is desired to have both locks. More specifically, the electric lock is desired to be used normally such that the lock can be unlocked when the terminal is in operation. On the one hand, the manual lock is desired to be used upon power failure.

DETAILED DESCRIPTION

In accordance with an embodiment, a point-of-sale (POS) terminal includes a main body, a door attached to the main body, an electric lock attached to one of the main body and the door and including a first movable part configured to move between a lock position and an unlock position using electric power, and a manual lock attached to the other one of the main body and the door and including a second movable part that is manually movable between a lock position and an unlock position. When the door is in a closed state and the first and second movable parts are both at the lock position, the first and second movable parts restrict move of the door. When the door is in the closed state and at least one of the first and second movable parts is at the unlock position, the door is movable.

Figure 1:
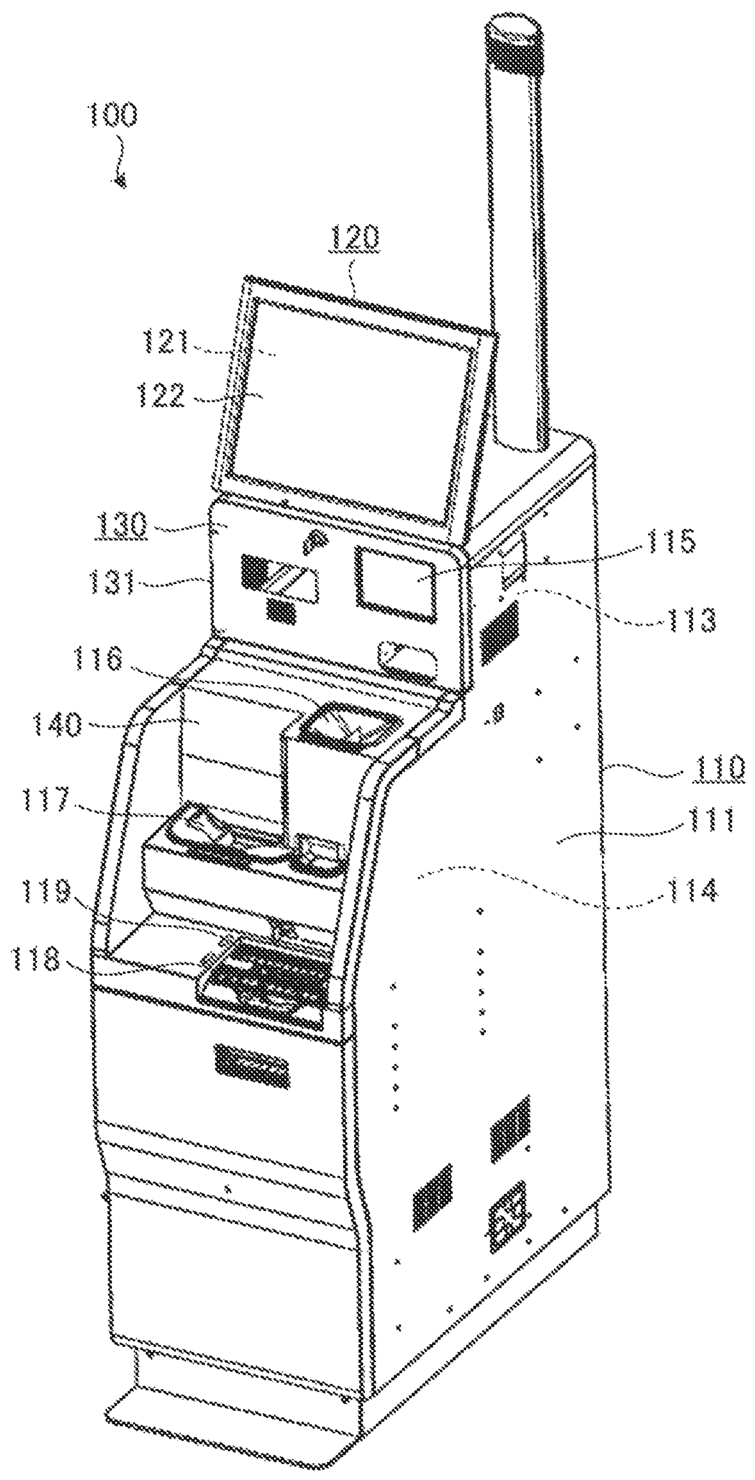
FIG. 1 is a perspective view of a self-checkout point-of-sale (POS) terminal according to an embodiment.

An embodiment is described with reference to the accompanying drawings. FIG. 1 is a perspective view of a self-checkout POS (Point Of Sales) terminal 100. The self-checkout POS terminal 100 is referred to as a self-checkout apparatus and is an example of an electronic device including a door structure. The door structure includes a lock system. The self-checkout POS terminal 100 is used by a customer to complete a self-checkout operation by himself or herself, without being operated by a store clerk. The self-checkout operation includes, for example, registration and settlement of a purchased commodity.

The self-checkout POS terminal 100 includes a display operation panel 120 on a vertical main body section (second base) 110. The main body section 110 includes a communication I/F (interface) 112 (refer to FIG. 6), a reading device 113, and a depositing/dispensing device 114 inside a housing 111, i.e., an outer casing. The reading device 113 and the depositing/dispensing device 114 are examples of well-known devices housed in the main body section 110. The reading device 113 is arranged above the depositing/dispensing device 114. The communication I/F 112 carried out data transmission and reception with a host terminal such as a store controller and a server.

The self-checkout POS terminal 100 includes doors (first base) 130 and 140. The main body section 110 includes two openings (not shown) respectively opened or closed by the doors 130 and 140 at the front side thereof. In other words, the housing 111 is a container of which two portions at the front side are openable. The openings are vertically arranged, the opening at the upper part exposes the reading device 113 and surroundings thereof, and the opening at the lower part exposes the depositing/dispensing device 114. The door 130 covers the opening at the upper part, and the door 140 covers the opening at the lower part.

Figure 2:
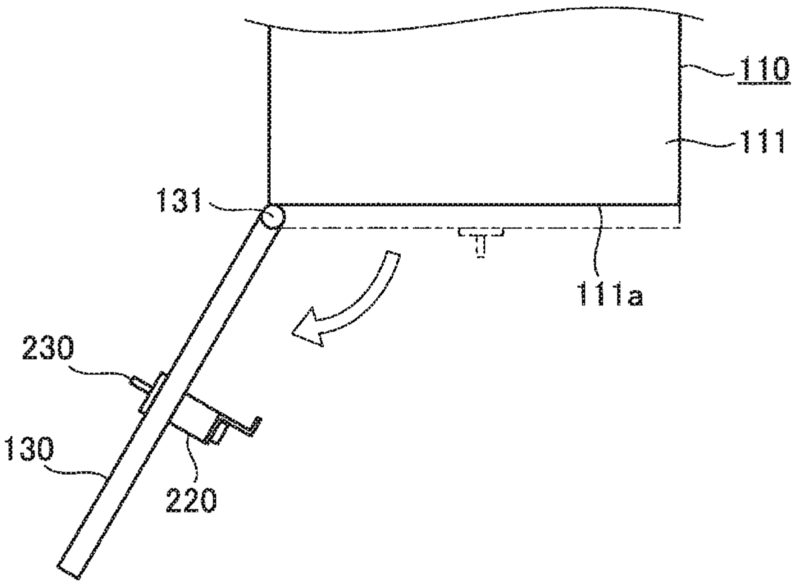
FIG. 2 is a schematic plan view of a main body section and a door of the self-checkout POS terminal, illustrating movement of the door.

FIG. 2 is a schematic plan view of the main body section 110 and the door 130, which illustrates movement of the door 130. The door 130 opens or closes the opening 111*a* of the housing 111 with rotation around a side 131 at left side of the front side facing the self-checkout POS terminal 100. The door 140 opens or closes the opening of the housing 111 with the rotation around an upper side.

The door 130 includes a reading window 115 at an upper part of the front side. The reading device 113 includes a camera (not shown) inside of the reading window 115. The customer holds a barcode of a purchased commodity over the reading window 115 at the time of registering the purchased commodity. The reading device 113 acquires commodity information from the barcode of the commodity photographed by the camera through the reading window 115.

The depositing/dispensing device 114 includes a coin receiving port 116, a change return port 117, a bill receiving port 118, and a bill return port 119, and is exposed from the door 140. The depositing/dispensing device 114 stores coins received through the coin receiving port 116 and bills received through the bill receiving port 118. The depositing/dispensing device 114 returns coins as change through the change return port 117 and returns bills as change through the bill return port 119.

The display operation panel 120 includes a monitor 121 and a touch panel 122 overlaid on a surface of the monitor 121. The display operation panel 120 displays information on the monitor 121 with characters and images and receives an operation corresponding to a display content on the monitor 121 through the touch panel 122.

Figure 3:
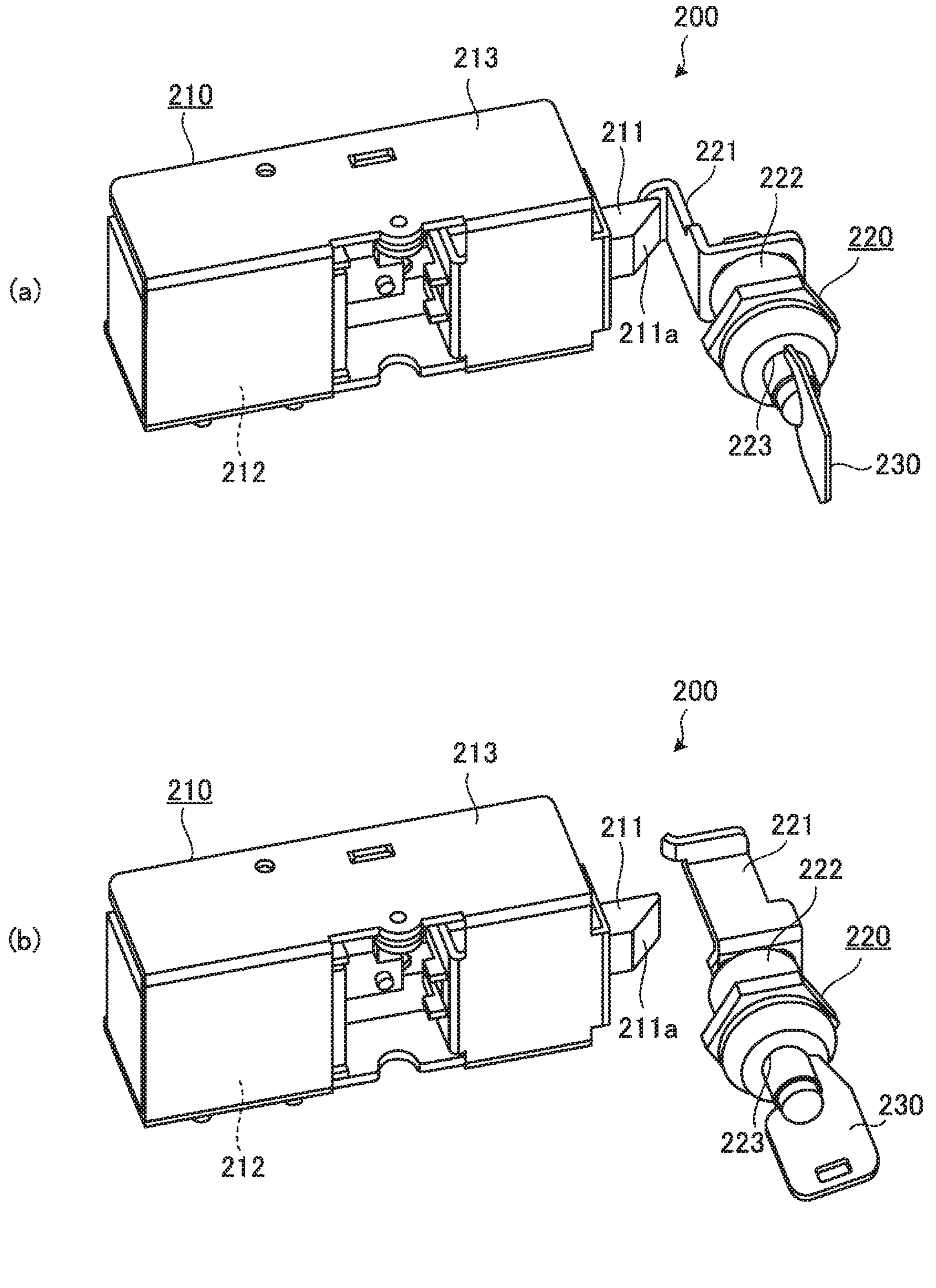
FIG. 3 is a perspective view of a lock system, in which (a) illustrates a locked state and (b) illustrates an unlocked state.
Figure 4:
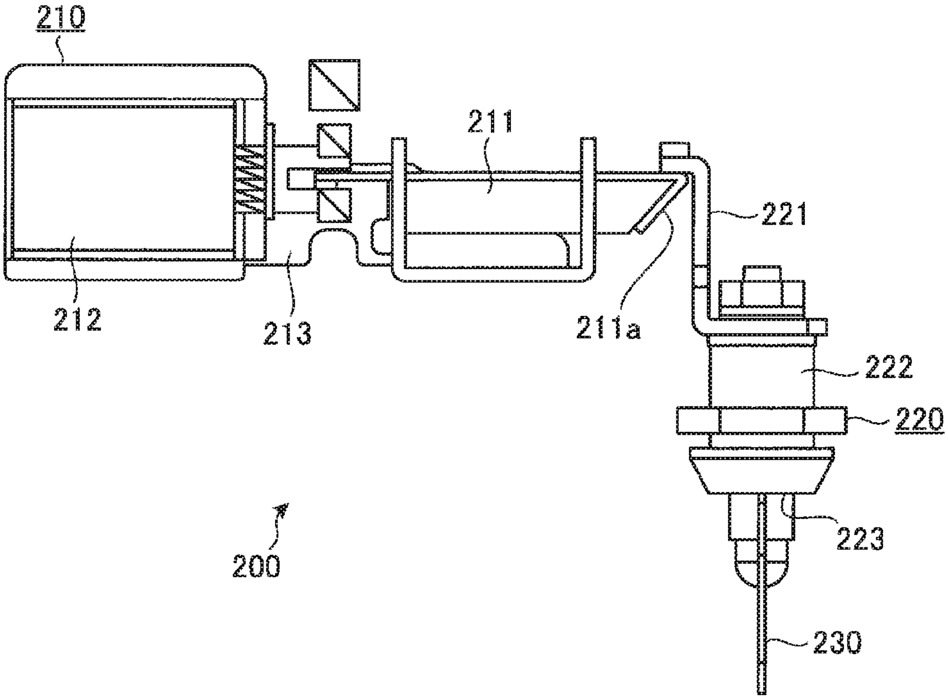
FIG. 4 is a plan view of the lock system, in which (a) illustrates a locked state and (b) illustrates an unlocked state.
Figure 4:
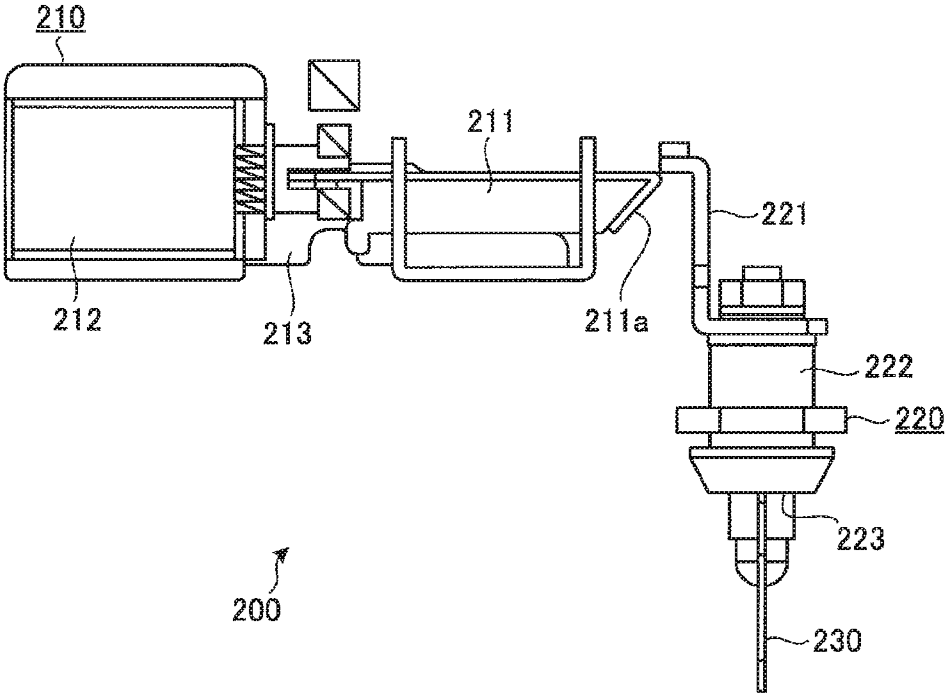

The self-checkout POS terminal 100 includes a lock system 200 for regulating opening and closing of the door 130 and a lock system (not shown) for regulating opening and closing of the door 140. As the two lock systems have the same configuration, only one lock system 200 is described. FIG. 3 is a perspective view of the lock system 200. FIG. 4 is a plan view of the lock system 200. In each of FIG. 3 and FIG. 4, (a) illustrates a locked state and (b) illustrates an unlocked state.

The lock system 200 is arranged between the door 130 and the main body section 110 to manage switching between the unlocked state and the locked state. In the unlocked state, the door 130 is capable of opening or closing the opening 111*a*. In the locked state, the door 130 is unable to open or close the opening 111*a*.

The lock system 200 includes an electromagnetic lock 210 as an example of an electric lock and a manual lock 220. The lock system. 200 forms the door structure together with the door 130.

If both an electrically-controlled lock and a manually-operated lock were simply mounted, locking and unlocking operations of both locks would be required because one of the locks is not unlocked even if the other lock is unlocked. According to the lock system 200 of the present embodiment, the unlock operation can be carried out by unlocking only one of the electrically-controlled lock and the manually-operated lock. Conventionally, there is a lock having a manual lock and an electric lock, where operation of the manual lock can be carried out also with electric control. According to such a lock, it is possible to manually and automatically lock and unlock the door 130. However, in a case in which a space for arranging a key hole cannot be provided in circumference of the door 130 as in the present embodiment, the lock is often disposed on the side the door 130 not on the side of the main body section 110. In this case, not only a weight is applied to the door 130, but also a power supply cable may be disconnected because the power supply cable to the lock extends from the main body section 110 side to the door 130 side. Such a failure would not occur in the lock system 200 of the present embodiment.

The electromagnetic lock 210 including a bolt 211, a solenoid 212, a frame 213 (refer to FIG. 3) and an elastic member 214 (refer to FIG. 5) is disposed on the main body section 110. The solenoid 212 is an example of an operation section for moving the bolt 211 between predetermined two positions.

The frame 213 is a substantially rectangular enclosure (frame) formed of a metal plate to protect the solenoid 212 covered therewith. A leaf spring (not shown) having an elastic force for energizing the door 130 in a withdrawing direction is mounted on the surface of the frame 213 opposite to the door 130.

FIG. 4 illustrates locking and unlocking by the electromagnetic lock 210 (the manual lock 220 is kept at a lockable position). The bolt 211, i.e., a rod-shaped member, is movable between predetermined two positions along a longitudinal direction. The predetermined two positions in the present embodiment are a home position (first position) and an attracted position (second position).

The bolt 211 is positioned at the home position while the solenoid 212 is not in operation. A projecting length of the bolt 211 from the frame 213 at the home position is longer than that of the bolt 211 at the attracted position. The bolt 211 is positioned at the attracted position while the solenoid

212 is in operation. The bolt 211 at the attracted position is attracted to the solenoid 212 in a direction in which the projecting length of the bolt 211 from the frame 213 becomes shorter. In other words, the bolt 211 projects at the home position and is retracted at the attracted position.

If receiving power, the solenoid 212 operates to generate a driving force for moving the bolt 211 from the home position to the attracted position. In a case in which the bolt 211 receives a load in the longitudinal direction while the solenoid 212 is not in operation, the bolt 211 is movable to the attracted position. Further, if the load applied to the bolt 211 is removed, the bolt 211 returns to the home position with an elastic force of the elastic member 214. The elastic member 214 is, for example, a helical spring or a rubber.

The manual lock 220 is manually operated with a key 230 to change a state from the locked state to the unlocked state and vice versa. FIG. 3 illustrates the locking and unlocking states by the manual lock 220 (the electromagnetic lock 210 maintains a lockable position (home position)). The manual lock 220 includes a dead bolt 221 acting as a second bolt, a cylinder 222, i.e., a manual operation section, and a key hole 223.

The key 230 is inserted into the keyhole 223. The cylinder 222 operates in accordance with rotation of the key 230 inserted into the key hole 223 in a clockwise direction or a counterclockwise direction with respect to the insertion direction of the key 230. Thus, the cylinder 222 rotates the dead bolt 221 in the clockwise direction or the counterclockwise direction. In this way, the dead bolt 221 rotates between a third position and a fourth position, and shifts from the third position to the fourth position and vice versa. The third position in the preset embodiment is a sideway position at which the dead bolt 221 faces the electromagnetic lock 210, and the fourth position is an upward position at which the dead bolt 221 rotates from the third position by 90 degrees.

The dead bolt 221 is lockable if the dead bolt 221 is located at the third position (refer to (a) of FIG. 3). In other words, the dead bolt 221 at the third position interferes with the bolt 211 located at the home position, which causes the locked state. However, the dead bolt 221 at the third position does not interfere with the bolt 211 if the bolt 211 is located at the attracted position.

The dead bolt 221 does not interfere with the bolt 211 (unlocked state) regardless of the position of the bolt 211 of the electromagnetic lock 210 if the dead bolt 221 is located at the fourth position (refer to (b) of FIG. 3).

In this way, in the lock system 200, as shown in FIG. 3, the bolt 211 located at the home position functions as a "strike" which interferes with the dead bolt 221 and causes the locked state for the manual lock 220. As shown in FIG. 4, the bolt 211 of the electromagnetic lock 210 has a guide slope 211*a* at the front end thereof. The bolt 211 functions as a so-called "latch bolt" described in detail below with reference to FIG. 5. However, the lock system 200 does not have a device corresponding to a "door-knob" for moving the "latch bolt".

The key 230 of the present embodiment can be freely inserted into or pulled out of the key hole 223 only if the dead bolt 221 is located at the third position. In other words, if the dead bolt 221 is located at the fourth position, the key 230 cannot be removed from the key hole 223.

Figure 5:
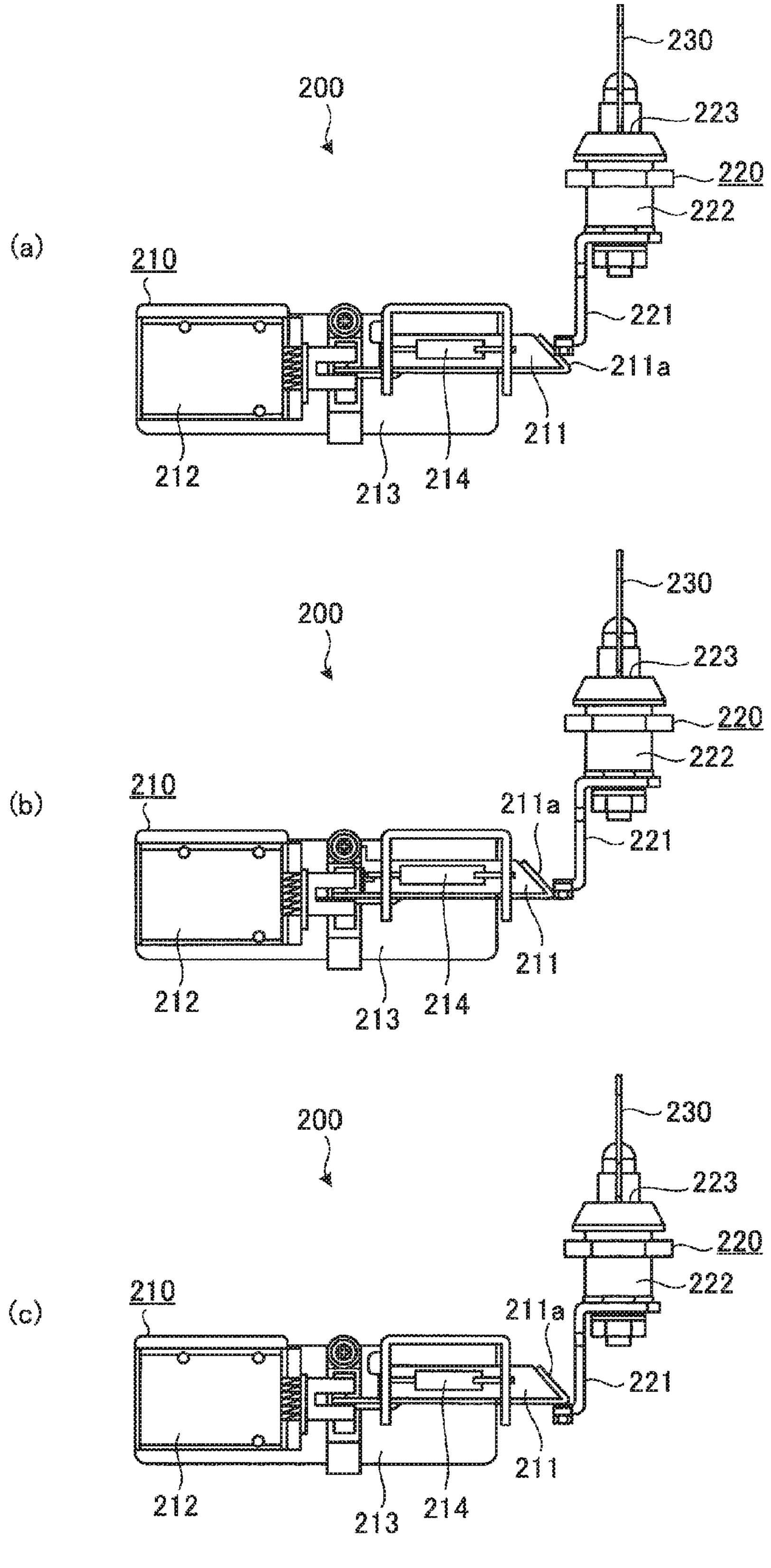
FIG. 5 illustrates movement of a bolt, in which (a) illustrates that a force is applied to a bolt with a dead bolt located at the third position, (b) illustrates that the dead bolt reaches the front end of the bolt and (c) illustrates the locked state.

FIG. 5 illustrates movement of the bolt 211 in a case in which the door 130 opened is pushed in a direction in which the opening (door 130) is closed when the dead bolt 221 is located at the third position. FIG. 5 illustrates the lock system 200 viewed from the rear side of the surface shown in FIG. 4. If the door 130 is pushed in a direction in which the opening is closed in a state in which the dead bolt 221 is located at the third position, the bolt 211 of the present embodiment moves as shown in FIG. 5 and causes the locked state.

In other words, if a force is applied to the bolt 211 with the dead bolt 221 located at the third position (refer to (a) of FIG. 5), the force is received by the guide slope 211*a* and then the force is converted to a force for retracting the bolt 211. The dead bolt 221 reaches the front end of the bolt 211 (refer to (b) of FIG. 5), and if the dead bolt 221 further passes over the front end, the bolt 211 returns to the home position with the elastic force applied by the elastic member 214 to the bolt 211, which causes the locked state (refer to (c) of FIG. 5).

Figure 6:
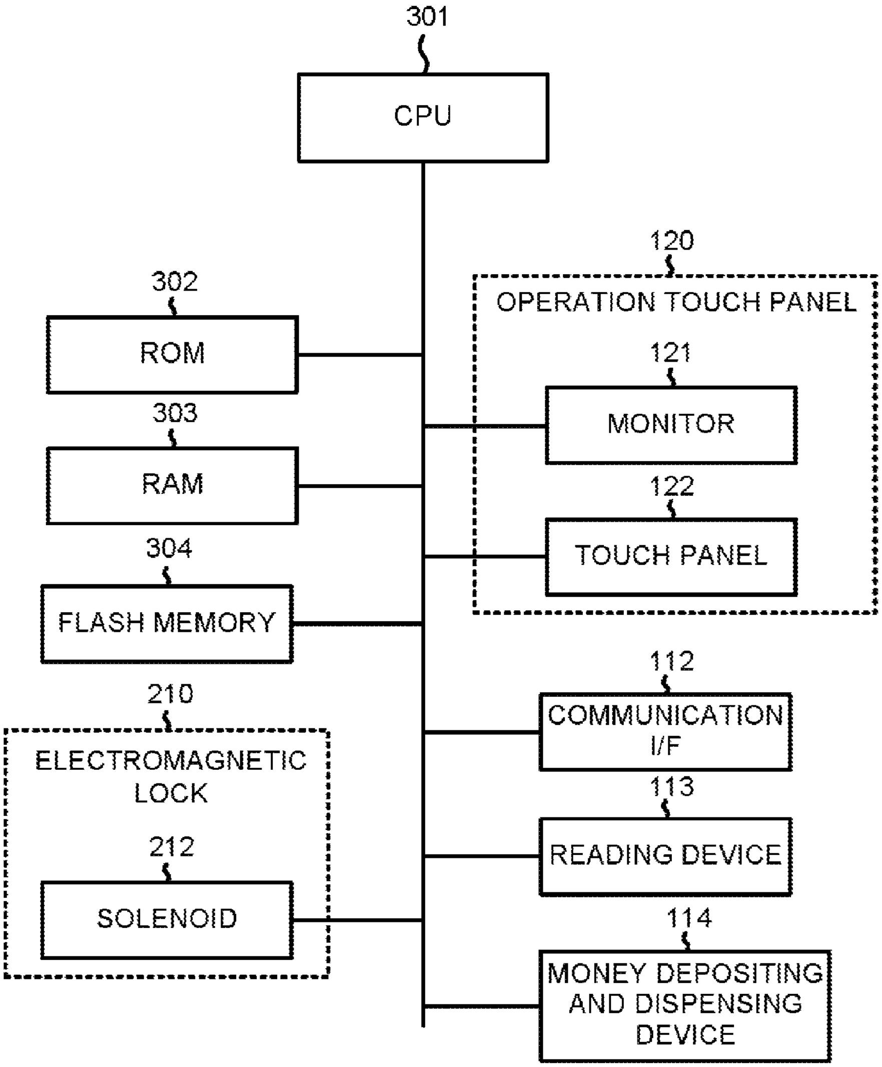
FIG. 6 is a block diagram of the self-checkout POS terminal, and a controller of the self-checkout POS terminal.
Figure 6:
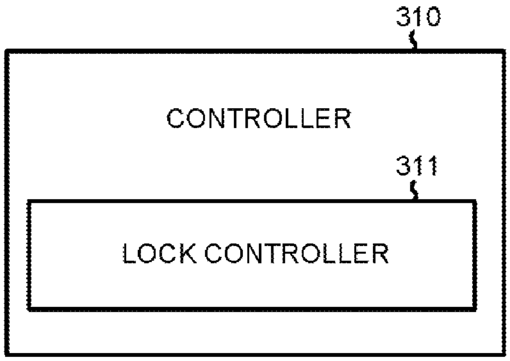

In FIG. 6, (a) is a block diagram of the self-checkout POS terminal 100, and (b) is a block diagram of a controller 310 of the self-checkout POS terminal 100. The self-checkout POS terminal 100 includes a CPU (Central Processing Unit) 301, a ROM (Read Only Memory) 302, a RAM (Random Access Memory) 303, and a flash memory 304 in addition to the above configuration.

The ROM 302 stores various programs executed by the CPU 301. The RAM 303 stores variable data in a rewritable manner and is used as a work area. The CPU 301 copies or decompresses the program stored in the ROM 302 to the RAM 303 and executes various kinds of arithmetic processing to function as various modules to control each section of the self-checkout POS terminal 100. The flash memory 304 is a rewritable nonvolatile memory for storing various settings.

The CPU 301, the ROM 302, and the RAM 303 serve as the controller 310. The controller 310 collectively controls each section of the self-checkout POS terminal 100. The controller 310 has a lock controller 311.

The lock controller 311 controls power for operating the electromagnetic lock 210. In other words, the lock controller 311 controls energization to the solenoid 212 to switch an operation/nonoperation of the solenoid 212. The lock controller 311 executes an ID check of an operator, and if an unlocking authority is given to the ID, the lock controller 311 operates the electromagnetic lock 210 to move the unlocked state. The ID check of the operator can be carried out in such a manner that the reading device 113 reads an ID code displayed on the ID card carried by the operator, for example.

In such a configuration described above, the lock system 200 can execute the locking and unlocking of the self-checkout POS terminal 100 with both the electric control and the manual operation. Hereinafter, procedures thereof are described. The operator who has the unlocking authority holds the ID card near the reading window 115 at normal time. In response to the operation, the lock controller 311 operates the electromagnetic lock 210 to unlock the electromagnetic lock 210. Then, the door 130 is flipped with the elastic force of the leaf spring mounted in the frame 213 and is opened.

At the time of power failure or at the time power is not on, the operator inserts the key 230 into the key hole 223 and rotates the key 230 to the fourth position to unlock the manual lock 220. Then, the door 130 is flipped with the elastic force of the leaf spring mounted in the frame 213 and is opened. Farther, the operator rotates the key 230 in a reverse direction to the third position and pulls the key 230 out of the key hole 223 at the third position.

In a case in which the door 130 is closed, the operator rotates the door 130 in a direction in which the opening 111*a* is closed. If the dead bolt 221 located at the door 130 side contacts with the bolt 211 located at the main body section 110, the operator closes the door 130 against the elastic force of the leaf spring mounted in the frame 213 and the elastic force of the elastic member built in the solenoid 212. At this time, the bolt 211 of the electromagnetic lock 210 moves as shown in (a)-(c) of FIG. 5. In this way, the dead bolt 221 located at the door 130 side passes over the bolt 211 to become the locked state.

In this way, according to the present embodiment, the locking and unlocking of the self-checkout POS terminal 100 can be executed with both the electric control and the manual operation.

In the foregoing procedures, pulling out of the key 230 after the manual lock 220 is unlocked is not necessarily carried out, but it is desirable to pull out the key 230 after that. After the unlocking of the manual lock 220, since the key 230 of the present embodiment is separately taken from the self-checkout POS terminal 100, the operator can put the key 230 in his or her pocket. Therefore, loss of the key 230 can be prevented. In a case in which the key 230 is worn by the operator with a strap, since the key 230 is separately taken from the self-checkout POS terminal 100 after the manual lock 220 is unlocked, the operator can freely move from the self-checkout POS terminal 100.

In a case in which the key 230 is not pulled out after the manual lock 220 is unlocked, the dead bolt 221 stays at the fourth position, and thus the operator is not required to push against the elastic force at the time of closing the door 130. The operator rotates the key 230 to the third position to pull the key 230 out of the key hole 223 after the door 130 is closed.

Furthermore, the electromagnetic lock 210 of the present embodiment is mounted in the main body section 110, but the electromagnetic lock 210 may be mounted in the door 130 (140). However, there is a possibility that disconnection of a power supply cable occurs if the electromagnetic lock 210 to which power is necessarily supplied is mounted on the door 130 (140), and thus it is preferable to arrange the electromagnetic lock 210 on the main body section 110.

In the present embodiment, the solenoid 212 is an example of the operation section; however, the operation section may not be the solenoid.

Further, in the present embodiment, the manual lock 220 includes the dead bolt 221 which rotates; however, the movement direction of the dead bolt 221 is not limited thereto. For example, the dead bolt 221 may straightly be moved.

Similarly, in the present embodiment, the bolt 211 moves straightly; however, the direction of movement of the bolt 211 is not limited thereto. For example, the bolt 211 may be rotated in the movement.

In addition, in the present embodiment, the bolt 211 at the home position projects compared with it at the time power is supplied; however, it may be reverse to the present embodiment. In other words, the electromagnetic lock may be constructed with the solenoid which projects when power is supplied.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A point-of-sale (POS) terminal comprising:

a main body including a cash receptor, a cash dispenser, an optical code reader, and a display;

a door attached to the main body and movable for opening and closing a space formed in the main body;

an electric lock attached to one of the main body and the door and including a first movable part configured to move between a lock position and an unlock position using electric power; and a manual lock attached to the other one of the main body and the door and including a second movable part that is manually movable between a lock position and an unlock position, wherein when the door is in a closed state and the first and second movable parts are both at the lock position, the first and second movable parts restrict movement of the door, and when the door is in the closed state and at least one of the first and second movable parts is at the unlock position, the door is movable.

2. The POS terminal according to claim 1, wherein the electric lock is attached to the main body, and the manual lock is attached to the door.

3. The POS terminal according to claim 1, wherein the electric lock moves the first movable part using an electromagnetic force.

4. The POS terminal according to claim 1, wherein the first movable part is configured to move linearly, and the second movable part is movable rotationally.

5. The POS terminal according to claim 4, wherein the manual lock includes a keyhole and the second movable part is movable manually when a key that matches the key hole is inserted in the key hole.

6. The POS terminal according to claim 4, wherein the first movable part is a bolt that is elastically urged in a direction from the unlock position to the lock position of the first movable part, and the second movable part includes a portion that contacts an end of the bolt when the door is in the closed state and the first and second movable parts are both at the lock position.

7. The POS terminal according to claim 6, wherein the bolt has a latch portion, and when the door is moved for closing while the first and second movable parts are both in the lock position, the latch portion is pressed toward the unlock position of the bolt against an elastic urging force by the portion of the second movable part.

8. A lock system comprising:

an electric lock that is attachable to one of first and second bases at least one of which is movable relative to the other for opening and closing and includes a first movable part configured to move between a lock position and an unlock position using electric power; and a manual lock that is attachable to the other one of the first and second bases and includes a second movable part that is manually movable between a lock position and an unlock position, wherein when the first and second bases are in a closed state and the first and second movable parts are both at the lock position, the first and second movable parts restrict movement of the first base relative to the second base, and when the first and second bases are in the closed state and at least one of the first and second movable parts is at the unlock position, the first base is movable relative to the second base.

9. The lock system according to claim 8, wherein the electric lock moves the first movable part using an electromagnetic force.

10. The lock system according to claim 8, wherein the first movable part is configured to move linearly, and the second movable part is movable rotationally.

11. The lock system according to claim 10, wherein the manual lock includes a keyhole and the second movable part is movable manually when a key that matches the key hole is inserted in the key hole.

12. The lock system according to claim 10, wherein the first movable part is a bolt that is elastically urged in a direction from the unlock position to the lock position of the first movable part, and the second movable part includes a portion that contacts an end of the bolt when the first and second bases are in the closed state and the first and second movable parts are both at the lock position.

13. The lock system according to claim 12, wherein the bolt has a latch portion, and when the first base is moved for closing while the first and second movable parts are both in the lock position, the latch portion is pressed toward the unlock position of the bolt against an elastic urging force by the portion of the second movable part.

14. A door structure comprising:

a main body;

a door attached to the main body and movable for opening and closing a space formed in the main body;

an electric lock attached to one of the main body and the door and including a first movable part configured to move between a lock position and an unlock position using electric power; and a manual lock attached to the other one of the main body and the door and including a second movable part that is manually movable between a lock position and an unlock position, wherein when the door is in a closed state and the first and second movable parts are both at the lock position, the first and second movable parts restrict movement of the door, and when the door is in the closed state and at least one of the first and second movable parts is at the unlock position, the door is movable.

15. The door structure according to claim 14, wherein the electric lock is attached to the main body, and the manual lock is attached to the door.

16. The door structure according to claim 14, wherein the electric lock moves the first movable part using an electromagnetic force.

17. The door structure according to claim 14, wherein the first movable part is configured to move linearly, and the second movable part is movable rotationally.

18. The door structure according to claim 17, wherein the manual lock includes a keyhole and the second movable part is movable manually when a key that matches the key hole is inserted in the key hole.

19. The door structure according to claim 17, wherein the first movable part is a bolt that is elastically urged in a direction from the unlock position to the lock position of the first movable part, and the second movable part includes a portion that contacts an end of the bolt when the door is in the closed state and the first and second movable parts are both at the lock position.

20. The door structure according to claim 19, wherein the bolt has a latch portion, and when the door is moved for closing while the first and second movable parts are both in the lock position, the latch portion is pressed toward the unlock position of the bolt against an elastic urging force by the portion of the second movable part.

* * * * *